United States Patent Office.

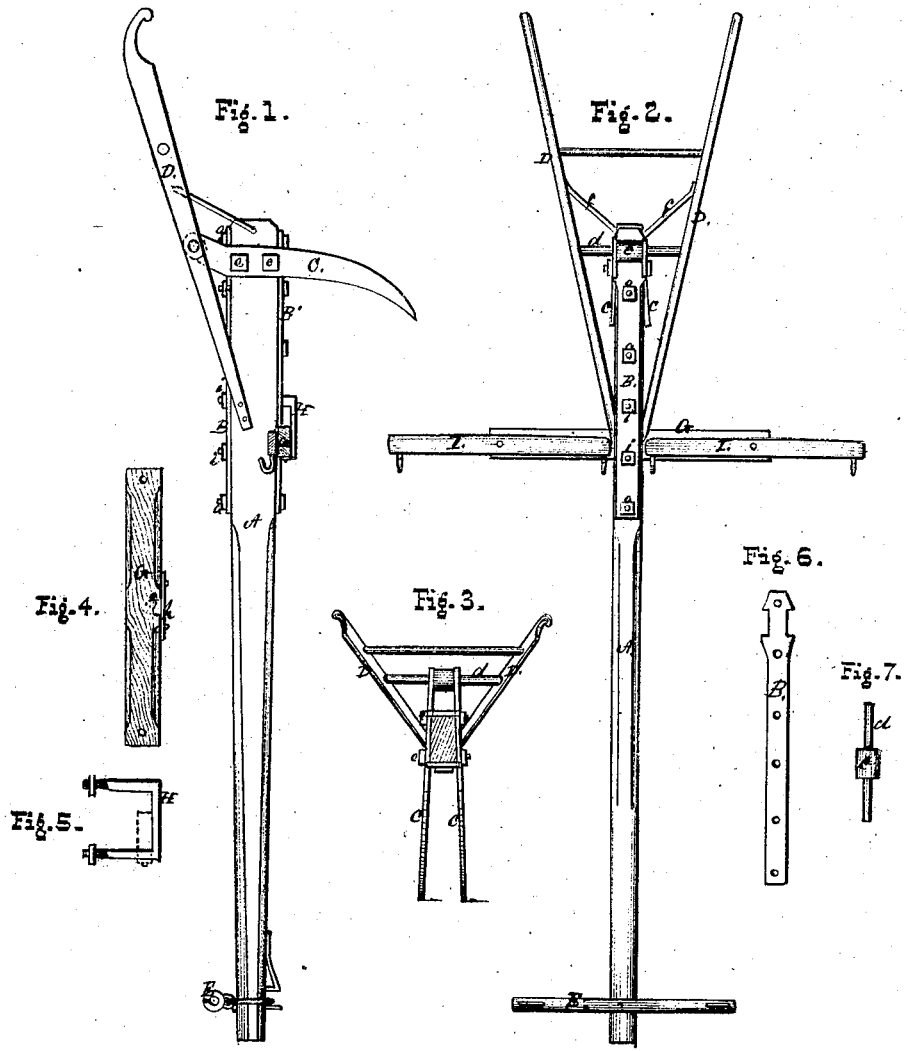

JAMES B. LYONS, OF MILTON, CONNECTICUT.

Letters Patent No. 100,165, dated February 22, 1870.

IMPROVEMENT IN STONE AND STUMP-EXTRACTOR.

The Schedule referred to in these Letters Patent and making part of the same.

*To all whom it may concern:*

Be it known that I, JAMES B. LYONS, of Milton, in the county of Litchfield, and State of Connecticut, have invented certain new and useful Improvements in Stone and Stump-Extractors; and the following is a full, clear, and exact description of the same, reference being had to the accompanying drawings making a part of this specification, in which—

Figure 1 represents a side view elevation of the implement.

Figure 2 shows a plan or top view of the same all complete.

Figure 3 shows a rear end view of the beam, handles, braces, and hooks.

Figure 4 shows the doubletree-bar and the mode of securing it on the under side of the beam.

Figure 5 shows a detached view of the staple and screw-nuts for securing the doubletree to the beam.

Figure 6 is a view of the metal plates for strengthening the implement.

Figure 7 shows a detached view of the cross-bar for connecting the prongs with the handles and strengthening the whole structure.

My invention relates to the class of agricultural implements for clearing land of rock, stumps, and roots, and fitting it for cultivation; and It consists in the construction of the prongs and the mode of securing them to the beam and connecting them with the handles in such a manner as to secure the greatest strength and efficiency without making the implement heavy and cumbersome to handle.

Also, in the arrangement of placing and securing the doubletree to the under side of the beam so that a greater lifting-purchase is obtained without pressure on the neck-yoke.

To enable others to make and use my invention, I will describe it more fully, referring to the drawings and to the letters marked thereon.

I make the beam or tongue A about twelve feet in length, of tough hard timber, of any desired thickness and width at the rear end to get the required strength, on the top and under side of which I place and secure by bolts *a a a* two plates of metal, B and B', which reach from the rear end full one-third of the length of the beam A, the plates having notches near the rear end, into which are fitted the prongs C to aid in holding them in their place to the sides of the beam A by the bolts *c c*.

The prongs or hooks are made of bars of iron of any required width and thickness, and are curved and tapered to a point to take hold of a rock, stone, stump, or other obstacle to be loosened and removed.

The upper ends of the prongs C C above where they are bolted on to the beam A extend up above the beam and top plate B, and are inclined back on an angle of about twenty-two degrees and are brought in a line with the handles D D, and are connected to a cross-bar, *d*, by it passing through holes or eyes made in the upper ends of the prongs C C, they being held stiff on the cross-bar *d* by pressing against the square shoulders of the enlarged portion *e* in the center, thus dispensing with a post or other support for the handles, unless it be small braces *f f'*, as shown in fig. 2.

In order to get a greater lifting-power without bearing hard on the neck-yoke E, I place the doubletree G on the under side of the beam or tongue A and secure it in place for working by having a notch, *g*, in one edge of the central portion, with a plate of metal, *h*, to keep it in place on the staple H, which is made with a space of sufficient width between the belts for the doubletree G to work in, and is fitted to the plates B B' and beam A about one-fourth of the distance from the rear end, and is secured in its position by the nuts *i i* on the top plate.

The whiffletrees I I are made and attached to the doubletree G in the usual manner.

When it desirable to use oxen instead of horses to operate the implement, it is only necessary to remove the doubletree and neck-yoke and hitch the team to the end of the tongue, and can be operated very effectually in this manner.

An implement as above described is found to be very efficient in digging around rocks and stumps and turning them out of their beds and removing them short distances, and also is a very efficient instrument for cutting ditches and drains in low lands and meadows, &c.

What I claim as my invention and desire to secure by Letters Patent, is—

1. The arrangement and combination of the prongs C C with the cross-bar *d*, enlarged central portion *e*, when secured to the beam A, for operating substantially in the manner as and for the purposes specified.

2. The arrangement and combination of the beam A, staple H, and doubletree G, operating in the manner and for the purposes herein set forth.

JAMES B. LYONS.

Witnesses:
J. B. WOODRUFF,
CHAS. H. POOLE.